United States Patent Office 3,514,935
Patented June 2, 1970

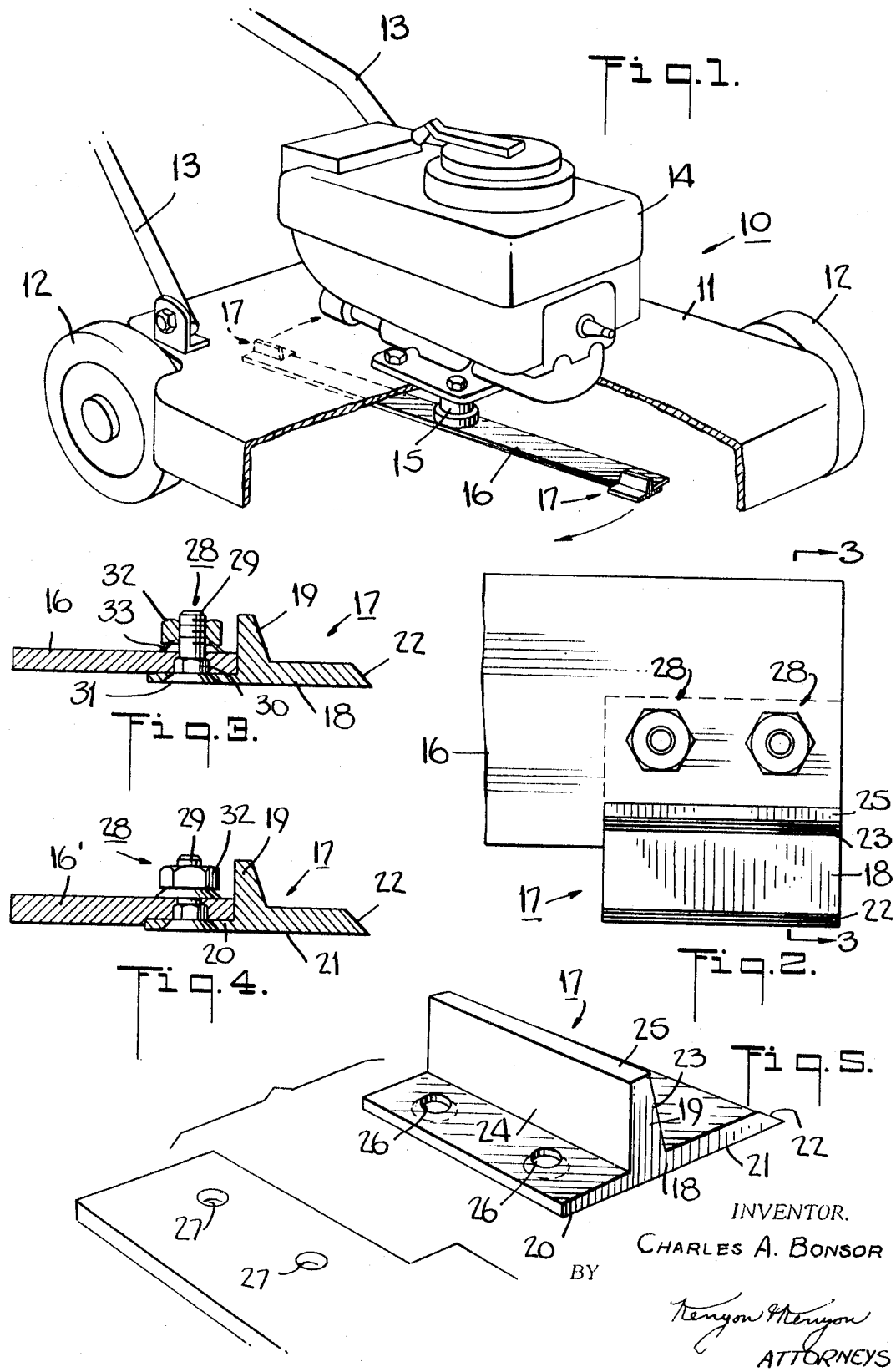

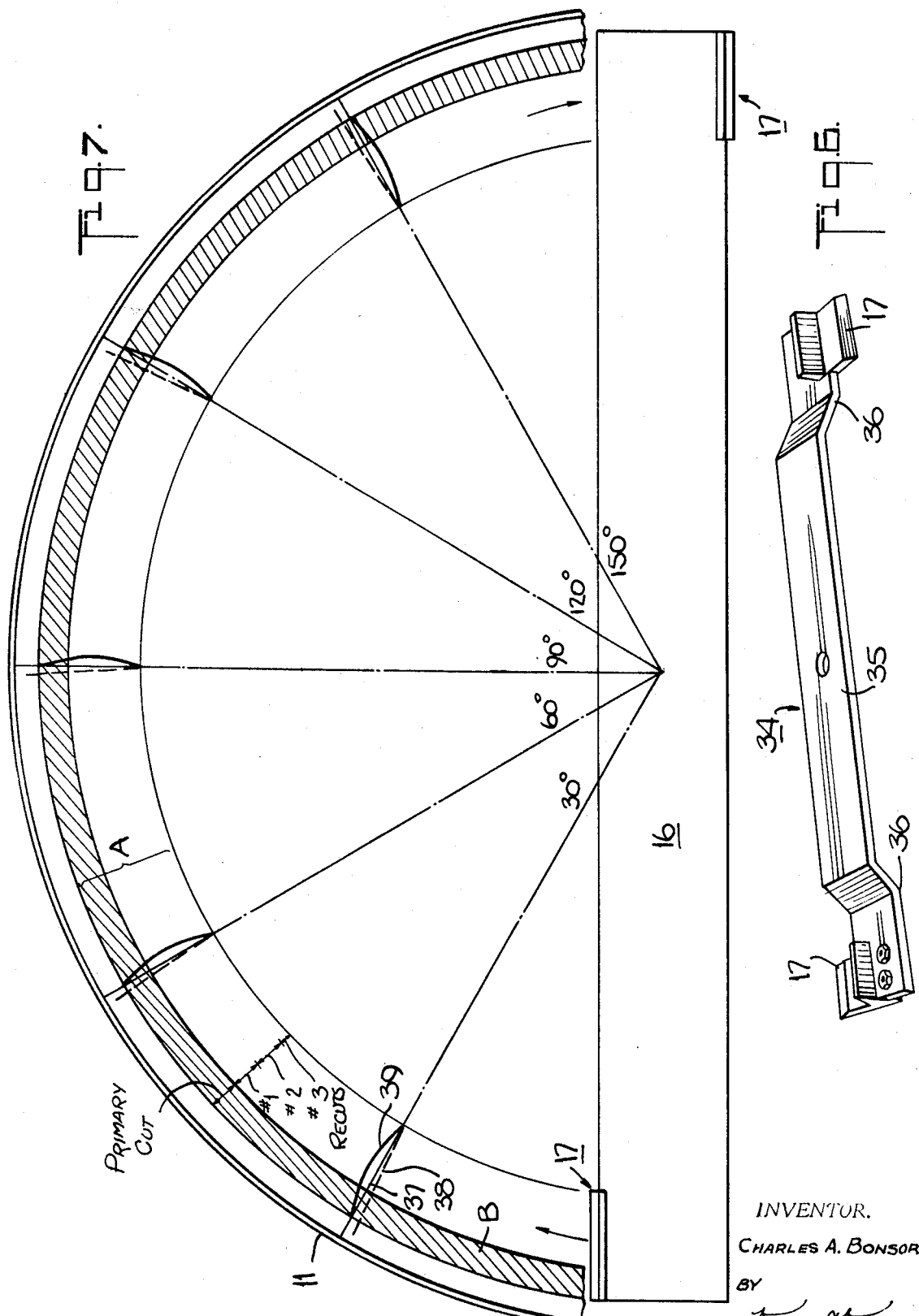

3,514,935
CUTTING ATTACHMENT FOR MOWER BLADES
Charles A. Bonsor, 14 New Highway 50,
Ridge Manor, Fla. 33525
Filed Sept. 13, 1966, Ser. No. 579,055
Int. Cl. A01d 55/18
U.S. Cl. 56—295                    16 Claims

ABSTRACT OF THE DISCLOSURE

The cutting attachment is provided with a forward knife edge portion and a rear attachment portion which are separated from each other by a central upstanding portion. The central upstanding portion protects the securing means for securing the attachment portion to the cutter blade against wear and external damage while at the same time functioning to cause air turbulence during rotation of the cutter blade so that the grass clippings can be ejected.

---

This invention relates to a cutting attachment for mower blades. More particularly, this invention relates to a cutting attachment for rotary mower blades.

Generally, rotary mower blades of power lawn mowers have utilized elongated substantially horizontal cutter blades which have been rotatably mounted at central points on the mowers to cut grass. In some cases, these cutter blades have been formed with flared portions along the non-cutting edges at the ends in order to provide an uplifting current of air for quickly removing the grass clippings. However, not only have these cutter blades been inefficient in cutting grass but also have caused frequent accidents to the user and surrounding property by becoming loosened and flying off the central mountings at high speed from under the lawn mowers.

Several attempts have been made to provide a more efficient mower blade as well as a safer mower blade for rotary mowers. These attempts have consisted in securing mower blade attachments to the ends of the mower blade. In some cases, a horizontally elongated revolvable mower blade has been used to carry rotatably mounted cutting discs at each end. While in other cases, a revolvable hollow elongated arm has been provided with a pivotable arcuate cutting blade at each end which is spring biased by springs within the hollow arm.

However, these heretofore cutting attachments have not provided a simple efficient means for cutting grass. Further, these attachments have not only been cumbersome to install but have also been expensive to fabricate since they have been made of a plurality of parts.

Generally, the invention provides a simple one piece cutting attachment which can be easily and rapidly installed in place. The cutting attachment is detachably secured to each end of a cutter blade and projects from the blade in the direction of rotation. The cutting attachment includes a knife edge portion for cutting grass and a central portion which projects upwardly over the cutter blade for creating an air turbulence to eject grass clippings. The attachment is secured to a cutter blade so as to extend below or be flush with the bottom surface of the cutter blade. The knife edge portion has a cutting edge which is straight, beveled or curved in a longitudinal direction as well as in cross section.

Accordingly, it is an object of the invention to provide a one piece cutting attachment for a rotary mower blade.

It is another object of the invention to provide a cutting attachment for elongated flat and turbo-jet types of cutter blades for rotary mowers.

It is another object of the invention to provide a cutting attachment which reduces the wear of a rotary cutter blade.

It is another object of the invention to provide a cutting attachment which can be quickly and easily mounted on a rotary blade cutter.

It is another object of the invention to provide a cutting attachment having a knife edge portion and an integral portion for creating an air turbulence to eject grass clippings.

It is another object of the invention to provide a cutting attachment of higher quality cutting materials than a rotary cutter blade carrying the cutting attachment.

It is another object of the invention to provide a cutting attachment which is simple and inexpensive to fabricate and use.

These and other objects and advantages of the invention will become more apparent from the following detailed description and appended claims taken in conjunction with the accompanying drawings in which:

FIG. 1 illustrates a fragmentary perspective view of a rotary lawn mower equipped with a flat cutter blade and cutting attachment according to the invention;

FIG. 2 illustrates a plan view of one end of the mower blade with a cutting attachment of the invention mounted thereon;

FIG. 3 illustrates a view taken on line 3—3 of FIG. 2;

FIG. 4 ilustrates a modification of the invention as used for bush hogs;

FIG. 5 illustrates an exploded view of a portion of a mower blade and a mower blade cutting attachment of the invention;

FIG. 6 illustrates a perspective view of a turbo-jet type cutter blade provided with a cutting attachment of the invention; and FIG. 7 illustrates diagrammatically the results obtained by cutting grass with the mower blade cutting attachment of the invention.

Referring to FIG. 1, a conventional power rotary mower 10 is provided with a housing 11 supported on a set of wheels 12. The mower 10 is manually moved across a lawn through handles 13 pivotally secured to the housing 11. The housing 11 mounts a prime mover 14, such as a gasoline engine, which causes rotation of a drive shaft 15.

An elongated flat cutter blade 16 is mounted in fixed relation on the drive shaft 15 so as to be rotated upon actuation of the drive shaft 15. The mounting of the cutter blade 16 is such that the drive shaft 15 is centrally disposed. A pair of cutter blade cutting attachments 17 are fixedly secured to the cutter blade 16; one at each end. The cutting attachments 17 are disposed on opposed sides of the cutter blade 16 so that the cutting attachments 17 face in the direction of rotation of he cutter blade 16 during grass mowing operation.

Referring to FIGS. 3 and 5, each cutting attachment 17 is formed of a one piece body with a knife edge portion 18, an elevated central portion 19 and an attachment portion 20. The knife edge portion 18 and attachment portion 20 form a continuous lower horizontal surface 21.

The knife edge portion 18 extends from the elevated central portion 19 and is formed with a beveled cutting edge 22. However, the cutting edge 22 can be of any suitable shape which facilitates cutting of grass, such as, straight, rounded or other efficient shape. Likewise, the knife edge portion 18 may be curved, beveled or straight longitudinally. Also, the knife edge portion 18 may be formed of a uniform thickness or of a thickness tapering to the cutting edge 22. Depending on the thickness of the cutter blade 16, the thickness of the knife edge portion 18 can vary from the thickness of the cutter blade to 0.020 inch. For example, for a cutter blade 16 of 3/16 inch thickness, the knife edge portion 16 may vary from 3/16 inch to 0.020 inch and for a cutter blade of 1/8 inch, the knife edge portion may vary from 1/8 inch to 0.020 inch.

The elevated central portion 19 is formed with a sloped wall 23 which projects upwardly from the knife edge portion 18, a vertical wall 24 which rises from the attachment portion 20, and a horizontal top surface 25 between the walls 23, 24.

The attachment portion 20 is formed of a uniform thickness, for example, 9/64 inch, and is provided with a pair of holes 26, each of which is beveled at the lower surface of the attachment 17.

Referring to FIGS. 2 and 3, in securing the attachment 17 to the cutter blade 16, the cutter blade 16 is partially cut away at each end to form a recess for the cutting attachment 17 and provided with a pair of holes 27. For example, a cutter blade 2¼ inches wide and 3/16 inch thick is provided with a cutout ½ inch in depth by 2 inches in length for an attachment length of 2 inches so that the end on the attachment is flush with the end edge of the cutter blade. The wall 24 of the central portion 19 is abutted against the cutter blade 16 cutout section with the attachment portion 20 positioned below the cutter blade 16. The pairs of holes 26, 27 are aligned and a pair of bolt assemblies 28 are passed through the holes to secure the cutting attachment 17 to the cutter blade 16. The bolt assemblies 28 can each be formed of a bolt 29 with a polygonal intermediate shoulder 30 for mating fit within a corresponding polygonal shaped hole in the cutter blade and a beveled head 31 for mating in the beveled hole in the attachment to provide a flush fit, and a lock nut 32 formed with a spring cup washer 33 which is flattened against the top surface of the cutter blade 16 upon tightening of the lock nut 32 to insure a locking securement of the cutting attachment 17 to the cutter blade 16.

The securement of the attachment 17 to the cutter blade 16 is such that the attachment 17 is quickly and easily detachable with proper tools.

When in place, the attachment cutting edge 22 projects in front of the cutter blade 16, for example, by 5/8 inch, for mowing and ejecting grass clippings before the cutter blade 16 becomes involved thereby extending the life of the cutter blade. In addition, the attachment portion 20 serves to protect the cutter blade 16 from wear since the cutter blade 16 is located above the grass cut line. The central portion sloped wall 23 creates an air turbulence which facilitates the ejection of grass clippings while eliminating the need for a turbulence fin on the rear edge of the cutter blade 16 as in turbo-jet type mower blades. In addition, the central portion protects the bolt assemblies 28 from wear during operation of the mower 10.

Because of the manner of attachment to the cutter blade 16, the cutting attachment 17 transfers impact directly to the cutter blade 16. Also, the attachments 17 can be secured to the cutter blade 16 without removing the cutter blade 16 from the drive shaft 15 of the mower 10.

Referring to FIG. 4, where a relatively thick cutter blade 16' is used, for example, on a bush hog mower, the cutter blade 16' is under-cut as above, at the ends, to provide two faces against which wall 24 and the rear portion of blade attachment 20 butt to transfer impact to the cutter blade 16'. The blade attachment lower portion 21 extends below the bottom surface of cutter blade 16' and protects it from wear.

Referring to FIG. 6, where a turbo-jet type blade 34 is used on a rotary mower, the cutting attachments 17 are secured to the ends of the blade 34 in a similar manner as described above in regard to the elongated flat cutter blade 16. The turbo-jet type blade 34 includes a centrally raised or arched portion 35 and depending end portions 36. The end portions 36 are suitably bored as above to mount the cutting attachments 17.

Referring to FIG. 7, when in operation, the cutting attachment 17 cuts a narrow ribbon of grass upon each revolution of the cutter blade 16. However, since the lawn mower 10 is moving across the grass at the same time that the cutter blade 16 is rotating, the primary cut of the grass is progressively displaced in the direction of movement of the mower from a circular shape by an amount equal to the movement of the mower corresponding to the arcuate position of the cutter blade. Further, depending on the width of the sharpened area and the feed to speed ratio used, each cutting attachment 17 recuts the grass a number of times. For example, for a 24 inch cutter blade and a 2 inch cutter blade attachment operating at a 30 to 1 gear ratio and a 60 to 1 effective cutting r.p.m. ratio, one attachment makes a primary cut and two recuts in the forward half of the circular ribbon of cut grass as well as three recuts in the rear half.

As shown in FIG. 7, the cutting attachments 17 traverse a path A in which a narrow ribbon B of grass is actually cut on a primary cut. Subsequently, the attachments recut the mower path 3 times. It is noted that the only grass under the housing 11 during operation is the grass in the narrow ribbon B and the grass between the ribbon B and the outside edge of the housing 11. Thus, the amount of grass which is vacuumed up for cutting is at a minimum. Also shown in FIG. 7 are the relationships between the cut ribbon B of grass and three types of attachment cutting edges. For a longitudinally straight cutting edge 37, the cutting attachment 17 meets the grass headon at every angle of travel. A longitudinally angled cutting edge 38 obtains a cutting-slicing effect similar to conventional angle turbo-jet mower blades and a curved cutting edge 39 obtains a cutting-slicing effect which is near perfect as the angle at which the cutting edge enters the grass does not change. The result obtained from edge 39 results from cutting a circle with a circle.

It is noted that rotary mowers having multiple forward speeds actually cut narrow ribbons of grass, for example, for speeds of 1 to 6 m.p.h. and a feed effective cutting r.p.m. of 7000 the width of cut grass varies from 0.15 inch to 0.90 inch; the cut width being substantially proportional to the speed. Thus, the cutting attachment of the invention is particularly efficient and useful in mowing grass.

Further, it is noted that where the cutting edges of the attachment are horizontal to the ground, a rotary mower closely approximates the quality of cutting of the best reel type mower. Also, since the cutting edges are on the lead edge of a cutter blade, the grass is cut before it can be influenced by the whirlwind under the blade.

The cutting attachment, by mowing below the bottom of cutter blade and providing its own air turbulence to help eject grass clippings, simplifies the designs of all types of rotary mower cutter blades. For instance, the flat cutter blade, offering an excellent degree of stability and many savings in manufacture, apparently has disappeared from the market. This invention makes it possible to salvage all the flat blade's advantages and from the consumer viewpoint economically practical to use. The cutting attachment likewise offers generous savings in design of turbo-jet types of cutter blades. It eliminates, for instance, intricate angle-bending and contouring, and makes it possible for them to achieve a quality of mowing equal to that of reel-type lawn mowers by positioning their cutter blade ends in a horizontal plane with the mowing machine and the ground. The cutting attachment in that position cuts grass evenly across the top and at a right angle rather than on a downward angle and an ascending line from the tip towards the center of the cutter blade. The attachment can be made of higher quality cutting metals than the cutter blade so that the cost of replacement and maintenance of mowing equipment is reduced to a minimum. The invention provides a simple cutting attachment, efficient in use, easily and rapidly attached to or removed from a rotary cutting blade.

Having thus described the invention, it is not intended that it be so limited as changes may be readily made therein without departing from the scope of the inven-

What is claimed is:

1. A cutting attachment for a rotary mower blade including a body having a knife edge portion for cutting grass, an attachment portion to the rear of said knife edge portion for securing said body to a rotary mower blade, and a central portion between said knife edge portion and said attachment portion projecting above said knife edge portion and said attachment portion for creating an air turbulence to eject grass clippings and to protect said attachment portion when mounted on the mower blade.

2. A cutting attachment as set forth in claim 1 wherein said knife edge portion includes a cutting edge.

3. A cutting attachment as set forth in claim 2 wherein said cutting edge is beveled.

4. A cutting attachment as set forth in claim 1 wherein said knife edge portion has a longitudinally angled cutting edge with respect to the longitudinal axis of said body.

5. A cutting attachment as set forth in claim 1 wherein said knife edge portion has a longitudinally curved cutting edge with respect to the longitudinal axis of said body whereby a cutting-slicing effect is obtained to cut grass.

6. A cutting attachment as set forth in claim 1 wherein said central portion has a sloped wall rising from said knife edge portion.

7. A cutting attachment as set forth in claim 1 wherein said body is one piece.

8. In combination with a rotary cutter blade of a rotary mower, a pair of cutting attachments mounted on each end of said cutter blade, each of said cutting attachments directed in a direction of rotation of said cutter blade, each of said cutting attachments having a knife edge portion projecting from said cutter blade in said direction of rotation, an attachment portion for securing said cutting attachment to said cutter blade, means securing said attachment portion to said cutter blade, and a central portion between said knife edge portion and said attachment portion projecting above said knife edge portion and said attachment portion for creating an air turbulence to eject grass clippings and to protect said means from abrasive wear and other external damage.

9. The combination as set forth in claim 8 wherein said cutter blade is cut out at each end and each said cutting attachment is disposed in a respective cut out, each said central portion abutting said cutter blade longitudinally thereof.

10. The combination as set forth in claim 8 wherein said means includes a pair of bolt assemblies, each of said bolt assemblies having a bolt mating in said cutter blade and said attachment portion, and a lock nut having a spring cup washer flattened against said cutter blade for detachably securing said cutting attachment on said cutter blade.

11. The combination as set forth in claim 8 wherein each said cutting attachment is fixedly secured to said cutter blade and extends along a minor portion thereof.

12. The combination as set forth in claim 11 wherein each said cutting attachment is formed of one piece.

13. The combination as set forth in claim 12 wherein said central portion has a vertical wall longitudinally abutting said cutter blade, a sloped wall projecting from said knife edge portion and a horizontal portion between said vertical and sloped walls.

14. The combination as set forth in claim 8 wherein said rotary cutter blade is a flat elongated type.

15. In combination with a rotary cutter blade of a rotary mower, said cutter blade being cut out and recessed at each end; a pair of cutting attachments mounted on each end of said cutter blade, each of said cutting attachments being disposed in a respective cut out and being directed in the direction of rotation of said cutter blade and including a knife edge portion projecting from said cutter blade in said direction of rotation, a central portion abutting said cutter blade longitudinally thereof and projecting above said cutter blade for creating an air turbulence to eject grass clippings, and an attachment portion received flush within a respective recess of said cutter blade, and means securing said attachment portion to said cutter blade.

16. In combination with a rotary cutter blade of a rotary mower, said cutter blade being cut out at each end; a pair of cutting attachments mounted on each end of said cutter blade, each of said cutting attachments being disposed in a respective cut out and being directed in the direction of rotation of said cutter blade and including a knife edge portion projecting from said cutter blade in said direction of rotation, a central portion abutting said cutter blade longitudinally thereof and projecting above said cutter blade for creating an air turbulence to eject grass clippings, and an attachment portion wherein said knife edge portion and said attachment portion define a lower surface positioned below said cutter blade, and means securing said attachment portion to said cutter blade.

References Cited

UNITED STATES PATENTS

| | | | |
|---|---|---|---|
| 2,576,884 | 11/1951 | Leigh | 56—295 |
| 2,592,755 | 4/1952 | Soenksen | 56—295 |
| 2,697,322 | 12/1954 | Watrous | 56—295 |
| 2,836,021 | 5/1958 | Wood et al. | 56—295 |
| 2,924,058 | 2/1960 | Brooks | 56—295 |
| 2,932,147 | 4/1960 | Beeston | 56—295 |
| 3,140,575 | 7/1964 | Ott et al. | 56—295 |
| 3,243,944 | 4/1966 | Michaud | 56—295 |
| 3,321,894 | 5/1967 | Ingram | 56—295 |
| 3,327,460 | 6/1967 | Blackstone | 56—295 |

F. BARRY SHAY, Primary Examiner

J. A. OLIFF, Assistant Examiner